US009126444B2

(12) United States Patent
Wakayama (10) Patent No.: US 9,126,444 B2
(45) Date of Patent: Sep. 8, 2015

(54) READING APPARATUS AND PRINTING APPARATUS (71) Applicant: CANON KABUSHIKI KAISHA, Tokyo (JP)

(72) Inventor: Naoki Wakayama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 302 days.

(21) Appl. No.: 13/683,423

(22) Filed: Nov. 21, 2012

(65) Prior Publication Data
US 2013/0135426 A1 May 30, 2013

(30) Foreign Application Priority Data

Nov. 25, 2011 (JP) ................. 2011-257426

(51) Int. Cl.
B41J 2/21 (2006.01)
B41J 11/00 (2006.01)
B41J 25/00 (2006.01)
B41J 25/312 (2006.01)
B41J 11/06 (2006.01)
B41J 25/308 (2006.01)
B41J 3/44 (2006.01)

(52) U.S. Cl.
CPC .............. B41J 25/312 (2013.01); B41J 2/21 (2013.01); B41J 3/44 (2013.01); B41J 11/0005 (2013.01); B41J 11/008 (2013.01); B41J 11/06 (2013.01); B41J 25/3084 (2013.01)

(58) Field of Classification Search
CPC .......... B41J 2/21; B41J 11/0005; B41J 11/06; B41J 25/3084; B41J 25/312
USPC .................. 347/102, 104, 105, 107
See application file for complete search history.

(56) References Cited

U.S. PATENT DOCUMENTS

| 5,416,613 | A | 5/1995 | Rolleston et al. |
| 7,864,783 | B2 | 1/2011 | Brewer et al. |
| 8,320,030 | B2 | 11/2012 | Kimura |
| 8,508,818 | B2 | 8/2013 | Tohnai |
| 2007/0243278 | A1 | 10/2007 | Anelli et al. |

(Continued)

FOREIGN PATENT DOCUMENTS

| JP | 2008-254221 A | 10/2008 |
| JP | 2008-281549 A | 11/2008 |
| JP | 2010-133915 A | 6/2010 |

OTHER PUBLICATIONS

U.S. Appl. No. 13/683,304, filed Nov. 21, 2012, Masaki Sumioka.

(Continued)

Primary Examiner — Justin Seo
Assistant Examiner — Kendrick Liu
(74) Attorney, Agent, or Firm — Canon USA Inc IP Division (57) ABSTRACT A reading apparatus includes a reading unit including a presser configured to press a sheet, a carriage configured to hold a sensor unit and to move on the presser, and a housing configured to store the sensor unit and the carriage and to hold the presser in a displaceable way. The reading apparatus further includes a movement mechanism configured to move the reading unit to a first position in which the presser presses a supporting surface and to a second position in which the pressing is released. The movement mechanism sets the reading unit to the first position during reading by the sensor unit and to the second position during movement of the sheet on the supporting surface.

13 Claims, 8 Drawing Sheets

(56) References Cited

U.S. PATENT DOCUMENTS

| | | |
|---|---|---|
| 2009/0034027 A1 | 2/2009 | Yoshimoto et al. |
| 2010/0110435 A1* | 5/2010 | Onishi .......................... 356/402 |
| 2010/0245950 A1 | 9/2010 | Osakabe |
| 2013/0135426 A1 | 5/2013 | Wakayama |
| 2013/0147872 A1* | 6/2013 | Yoneyama ..................... 347/19 |

OTHER PUBLICATIONS

U.S. Appl. No. 13/683,328, filed Nov. 21, 2012, Takeshi Koda.
U.S. Appl. No. 13/683,366, filed Nov. 21, 2012, Masaki Sumioka.
U.S. Appl. No. 13/683,392, filed Nov. 21, 2012, Daigo Kuronuma.
U.S. Appl. No. 13/683,450, filed Nov. 21, 2012, Masaki Sumioka.
Canon Inc., imageRUNNER Advance 6075/6065/6055 Quick Reference, 2010, pp. 45-46, Tokyo JP.

* cited by examiner

READING APPARATUS AND PRINTING APPARATUS

BACKGROUND OF THE INVENTION

1. Field of the Invention

The present invention relates to a reading apparatus for performing colorimetry of a color pattern formed on a sheet, and a printing apparatus including the reading apparatus.

2. Description of the Related Art

Japanese Patent Application Laid-Open No. 2008-281549 discusses an ink jet printer including a colorimetric apparatus. This colorimetric apparatus performs colorimetry of a printed color pattern for color calibration and, based on colorimetric data, adjusts colors of color images to be subsequently printed, thus reproducing desired colors. The printer records color patches as a color pattern for color calibration, and then the colorimetric apparatus performs colorimetry of the color patches with a colorimetric sensor moving in the sheet width direction.

With the colorimetric apparatus discussed in Japanese Patent Application Laid-Open No. 2008-281549, with the sheet being pressed by a presser plate, a wheeled carriage on which the colorimetric sensor is mounted runs on the presser plate, and the colorimetric sensor reads the color patches, thus performing colorimetry. When the carriage on which the colorimetric sensor is mounted separates from the presser plate, a pressing member rotatably shifts to separate from the sheet.

When performing sheet colorimetry, the colorimetric apparatus discussed in Japanese Patent Application Laid-Open No. 2008-281549 rotatably shifts a presser plate, which is regularly raised, to press a sheet. Subsequently, a carriage on which the colorimetric sensor is mounted moves to the presser plate and then reads the color patches while moving thereabove.

With this configuration, while the carriage exists above the presser plate, it is not possible to rotate the presser plate to retract the carriage. Specifically, to release the pressing by the presser plate to move the sheet, it is necessary to retract the carriage to the outside of the presser plate. The carriage reads the color patches only in the forward path and returns to a home position in the backward path (back feed). Before the carriage completes back feed (backward path) and retracts from above the presser plate to the outside, a following sheet cannot start being moved. This means that the time loss required for back feed disturbs the improvement in reading throughput. In particular, this issue will become distinct when sequentially reading a number of test patterns through repetitive carriage operations.

With the colorimetric apparatus discussed in Japanese Patent Application Laid-Open No. 2008-281549, when the wheel of the carriage runs upon the presser plate, the wheel passes the level difference for the thickness of the presser plate and the impact is transmitted to the carriage. Repetitively applying this impact to the carriage may cause degradation in the attachment accuracy of the colorimetric sensor or a failure of the colorimetric sensor. When the carriage is retracted to the outside of the presser plate, the wheel of the carriage travels on the sheet without the presser plate. Accordingly, when the sheet has a pattern or image printed thereon, the pattern or image may be damaged by the track of the wheel. Each of these factors may cause degradation in reading accuracy.

SUMMARY OF THE INVENTION

An example of the present invention is directed to a reading apparatus capable of achieving both a reduction in the total pattern read time and an improvement in the reading accuracy, and a printing apparatus including the reading apparatus.

According to an aspect of the present invention, a reading apparatus includes: a reading unit including a sensor unit configured to read information on a sheet, a presser configured to press a supporting surface for supporting the sheet, a carriage configured to hold the sensor unit and to move on the presser, and a housing configured to store the sensor unit and the carriage and to hold the presser in a displaceable way; and a movement mechanism configured to move the reading unit to a first position in which the presser presses the supporting surface and a second position in which the pressing is released, wherein the reading unit is set to the first position during reading of the information and is set to the second position during movement of the sheet on the supporting surface.

According to an exemplary embodiment of the present invention, the total throughput in the test pattern read sequence is improved, thus achieving both a reduction in the total pattern read time and an improvement in the reading accuracy. As a result, the calibration time, which is an unproductive time for a user of the printing apparatus, can be shortened. The user can use more time for image printing, which is an intended purpose, thus improving the productivity in printing operations.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
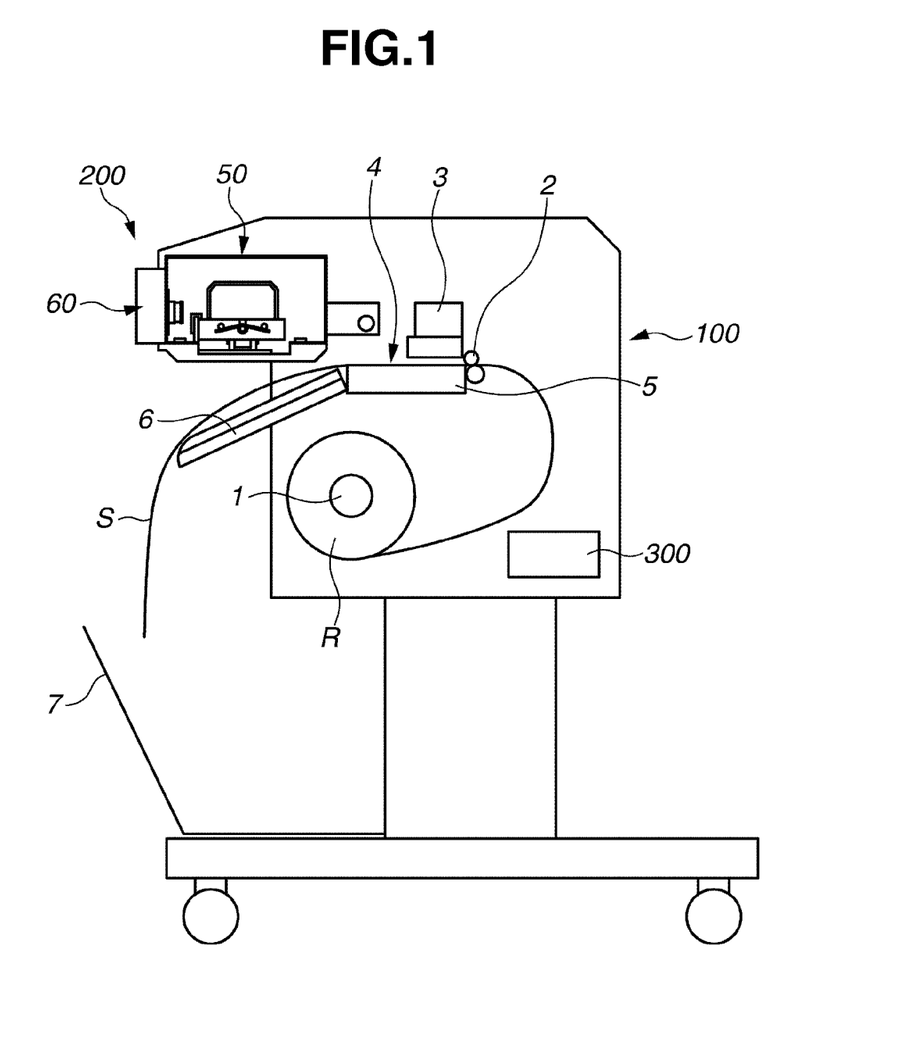
FIG. 1 is a cross sectional view illustrating an overall configuration of a printing apparatus.

An ink jet printing apparatus including a reading apparatus (colorimetric apparatus) according to an exemplary embodiment of the present invention will be described below. FIG. 1 is a cross sectional view illustrating an overall configuration of the printing apparatus. A printing apparatus 100 includes a sheet feed unit 1, a conveyance unit 2, a printing unit 3, a cutting unit 4, a platen 5, a fixed guide 6, a reading unit 200, and a control unit 300.

The sheet feed unit 1 rotatably holds a continuous sheet R wound in roll form. The sheet feed unit 1 pulls out a sheet S from the roll, and a conveyance roller pair of the conveyance unit 2 nips the sheet S and conveys it toward downstream. In the context of the present specification, at any position in the sheet conveyance path, the side toward the sheet feed unit 1 is referred to as "upstream" and the opposite side is referred to as "downstream".

The printing unit 3 includes a plurality of print heads corresponding to a plurality of colors. The printing unit 3 forms an image based on the serial print process, in which a carriage scans the sheet S conveyed on the platen 5 to make printing for each band, or on the line print process by using line heads. The present exemplary embodiment will be described below based on the serial print process. The plurality of print heads is inkjet print heads, which discharge ink from nozzles based on the inkjet process. The inkjet process may be based a heater, a piezoelectric element, a micro electromechanical system (MEMS) element, an electrostatic element, and any other devices.

The printing unit 3 can print a test pattern for inspection in addition to a regular desired image on the sheet S. The test pattern refers to a color pattern, such as color patches for color calibration, and a pattern for inspecting any non-discharge state of each nozzle.

The reading unit 200 is disposed downstream of the printing unit 3. The reading unit 200 includes a scanner unit 50 and a drying unit 60, which are integrated into one unit. The reading unit 200 can be detached from the printing apparatus 100 as one unit.

The scanner unit 50 scans a test pattern formed on the sheet S to acquire color information. The scanner unit 50 will be described in detail below. The drying unit 60 promotes the dryness of ink applied to the sheet S before reading by the scanner unit 50. The drying unit 60 includes a blower unit including a heater and a drying fan, and a duct for sending warm air generated by the blower unit to the surface of the sheet S. The drying unit may not necessarily include both the heater and the drying fan, and may not include either one as long as the drying unit exhibits required drying capability. An air outlet, having a width equal to or larger than the width of the sheet S to be dried, at the end of the duct blows off warm air to simultaneously dry the entire area of the sheet S directly under the air outlet.

The cutting unit 4 for cutting the continuous sheet R is disposed between the printing unit 3 and the reading unit 200. The cutting unit 4 cuts an area on the sheet S having the formed test pattern, or cuts a plurality of images printed on the sheet S on an image basis.

A basket-shaped sheet receiving member 7 is disposed at a bottom portion of the printing apparatus 100 which is anterior to the reading unit 200. A sheet discharged after completion of printing or inspection drops into the sheet receiving member by gravity, and is stacked therein.

The control unit 300 controls the printing apparatus 100 according to the present exemplary embodiment to enable executing not only the regular mode, in which regular image printing is performed, but also the inspection mode, in which a test pattern is printed and inspected for calibration. In the regular mode, the printing unit 3 prints one or a plurality of images on the sheet S, and the cutting unit 4 cuts the plurality of images on the sheet S on an image basis and discharges them. In the inspection mode, the printing unit prints one or a plurality of test patterns on the sheet S, the reading unit 200 reads the test pattern, and the cutting unit 4 cuts the rear end of the test pattern and discharges the sheet S.

Figure 2:
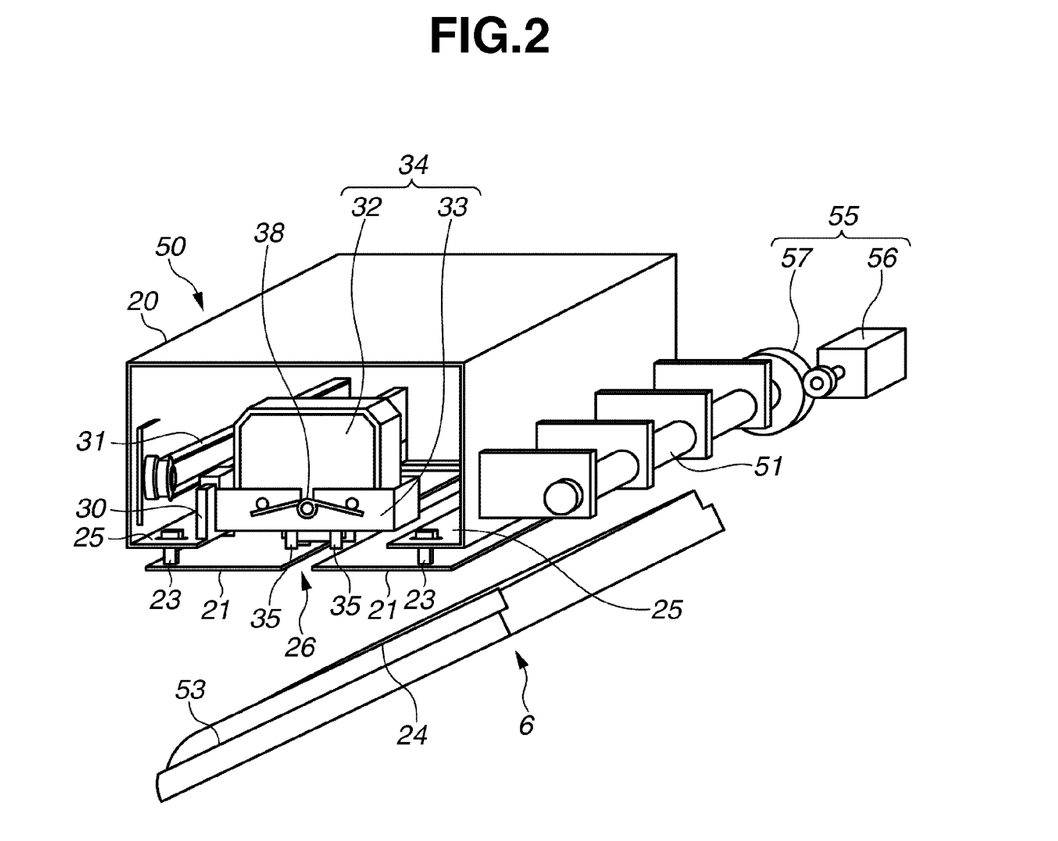
FIG. 2 is a cross sectional view illustrating an internal configuration of a scanner unit.
Figure 3:
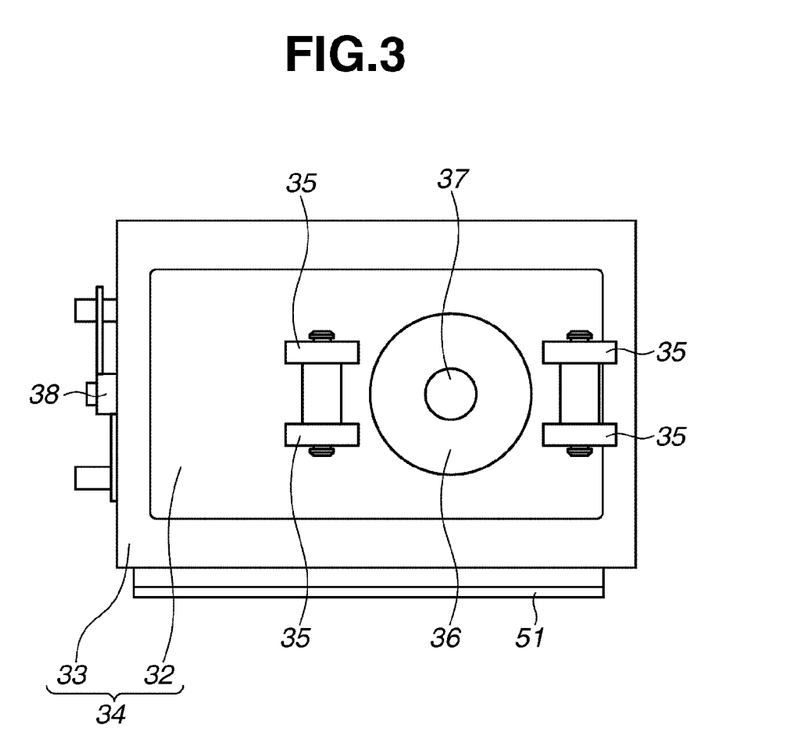
FIG. 3 is a bottom view illustrating the scanner unit.

The configuration and operations of the scanner unit 50 according to the present exemplary embodiment will be described in detail below. FIG. 2 is a cross sectional view illustrating an internal configuration of the scanner unit 50. FIG. 3 is a bottom view illustrating the scanner unit 50. As described above, the reading unit 200 includes the scanner unit 50 and the drying unit 60 in an integrated way. The reading unit 200 can move up and down with respect to a fixed guide 6 fixedly disposed under the reading unit 200.

The fixed guide 6 supports the sheet S on a supporting surface 24 (upper surface), which is downwardly inclined toward the downstream side, i.e., a given portion on a more downstream side (discharge side) in the first direction is lower in the gravity direction. The sheet S supported by the supporting surface 24 is subjected to ink drying by the drying unit 60 and scanning by the scanner unit 50.

The scanner unit 50 includes a sensor unit 32, a presser plate 21, a carriage 33 holding the sensor unit 32 and reciprocally moving on the presser plate 21, and a housing 20. In the scanner unit 50, a moving member 34, which includes the sensor unit 32 and the carriage 33, reciprocally moves for scanning. The moving member 34 reciprocally moves along a second direction perpendicularly intersecting with the first direction (sheet conveyance direction). The range of the reciprocal motion of the moving member 34 covers the sheet width, which is, for example, 60 inches. (To make it easier to understand, in FIG. 2, the length in the second direction is illustrated shorter than the actual length.) In the scanner unit 50, the housing 20 stores the sensor unit 32 and the carriage 33. The presser plate 21 is loosely connected with a reference plate 25, which is a bottom plate of the housing 20.

The sensor unit 32 includes a sensor device and a sensor holder for holding the sensor device. The sensor device includes a light source 36 and a light-sensitive element 37. The light source 36 irradiates with light the test pattern formed on the sheet S by the printing unit 3, and the light-sensitive element 37 receives light reflected by the test pattern. Information about the density and colors of the test pattern is acquired based on the signal strength of the light-sensitive element. The light source 36 and the light-sensitive element 37 may be positioned in reverse.

The sensor unit 32 is supported by a mechanism which allows the displacement in a rotational direction centering on the first direction and in the vertical direction with respect to the carriage 33. A spring member 38 is an urging member for urging the sensor unit 32 downward with respect to the carriage 33. A winding portion at the center of the spring member 38 is fixed to a shaft formed on the side surface of the sensor unit 32. Two arms of the spring member 38 are engaged with protrusions formed on the side surface of the carriage 33. Spring members 38 having a similar urging structure may be provided on both the front and rear surfaces of the carriage 33.

When reading the test pattern on the sheet S, the presser plate 21 presses the sheet S against the supporting surface 24 of the fixed guide 6 located under the sensor unit 32. The presser plate 21 is provided with first and second portions having an oblong shape extending within a predetermined range in a direction parallel to the moving direction (second direction) of the carriage 33. The first and second portions are disposed on each of the upstream and downstream sides of the reading position. The first and second portions may be different portions of one presser plate or portions of two divided plates. A slit 26 (an opening oblong along the second direction) is formed between the first and second portions of the presser plate 21. The slit 26 is an opening for allowing passage of light to scan the test pattern. The moving member 34 moves along the longitudinal direction of the slit 26. The sensor unit 32 irradiates the surface of the sheet S with light through the opening of the slit 26 to detect reflected light. Specifically, a reading position (reading area) of the test pattern exists directly under the slit 26.

The bottom portion of the sensor holder of the sensor unit 32 is provided with a first contact member, which contacts the surface of the first portion of the presser plate 21, and a second contact member, which contacts the surface of the second portion of the presser plate 21, when the moving member 34 moves. More specifically, wheel-like rotating members 35 are provided at four positions on the bottom surface of the sensor holder (see FIG. 3). When the carriage 33 moves in the second direction along with the guide rail 30, rotating members 35 contacting the upper surface of the presser plate 21 are rotatably driven to run thereon. Contacting members may not necessarily be rotating members, and may be sliding members having a small friction coefficient, which do not rotate.

A driving unit 31 for reciprocally moving the moving member 34 includes a motor, a driving belt, and two pulleys. The driving belt is stretched between the two pulleys along the second direction. A part of the driving belt is fixed to the carriage 33. The driving unit 31 converts the rotation of the motor into the rectilinear motion of the carriage 33. A guide rail 30 and the presser plate 21 constitute a guide unit for guiding the motion of the carriage 33 in the second direction. When the moving member 34 reciprocally moves, the rotating members 35 contact the upper surface of the presser plate 21, and a part of the carriage 33 contacts the guide rail 30, thus maintaining the posture of the moving member 34.

The presser plate 21 is attached to the reference plate 25 of the housing 20 of the scanner unit 50 via a coupling member, with a predetermined adjustment stroke (play), at a plurality of positions (two positions for each presser plate 21, a total of four positions). The coupling member is a structure in which a shaft-like column 23 fixed to the presser plate 21 is loosely coupled with a hole, larger than the column 23, formed on the reference plate 25. A stopper having a larger diameter than the column 23 is provided at the head of the column 23, which contacts the periphery of the hole to prevent the column 23 from coming off the hole. Each of the plurality of coupling members loosely coupled in this way allows the column 23 to displace within a permitted range in the vertical and oblique directions with respect to the housing 20. This enables minutely changing the posture of the surface of the presser plate 21 with respect to the scanner unit 50 within a range of the adjustment stroke of the coupling members. When the scanner unit 50 is lifted, the presser plate 21 is positioned at the lowermost end by its weight.

A movement mechanism 55 enables the scanner unit 50 to move up and down with respect to the fixed guide 6 to change the posture of the scanner unit 50. The movement mechanism 55 includes a driving unit including an elevating motor 56 and a gear train 57. A rotation shaft 51 is fixed to the gear train 57. The rotation shaft 51 is fixed to a plurality of support arms protruding from the housing 20 to the upstream side. Specifically, the movement mechanism 51 is disposed upstream of the sensor unit 32 (housing 20). With this structure, when the elevating motor 56 rotates, the rotation shaft 51 rotates with the rotational speed reduced by the gear train 57, and the scanner unit 50 rotates centering on the rotation shaft 51 to move up and down. The movement mechanism 55 does not necessarily rotate centering on the physical rotation shaft 51. Instead, the scanner unit 50 may rotate centering on a virtual rotation shaft, for example, by a link arm mechanism.

Figure 4A:
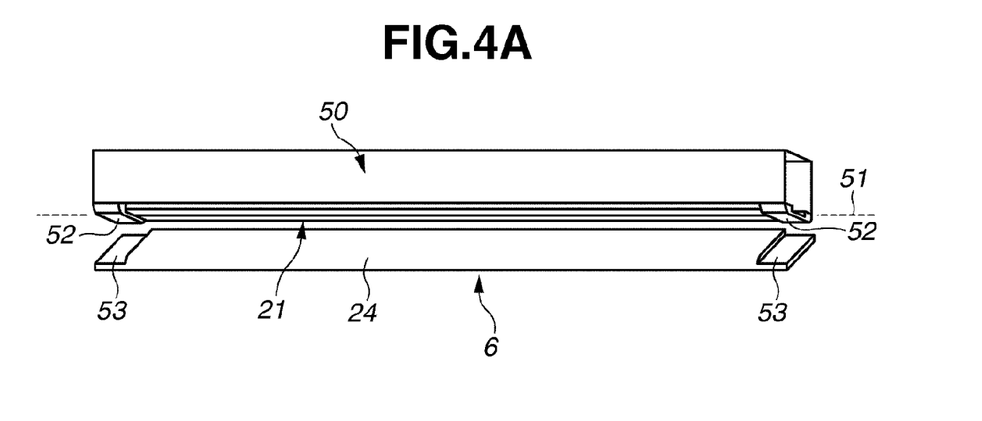
FIGS. 4A and 4B are perspective views illustrating a state where the posture of the scanner unit changes.
Figure 4B:
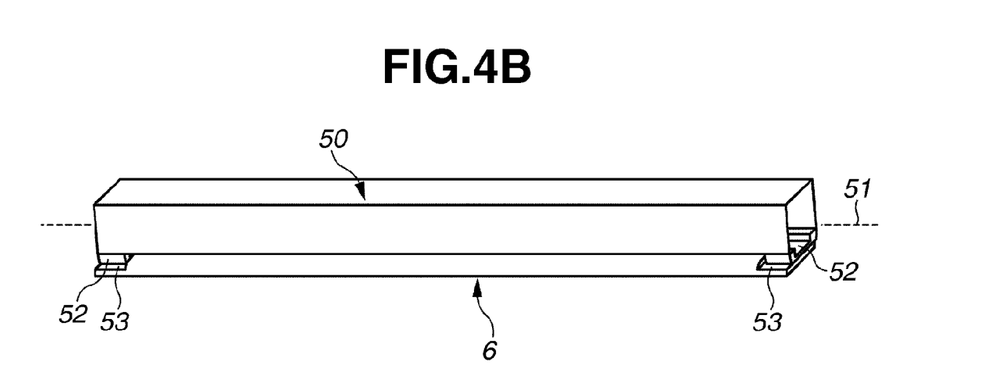

When the scanner unit 50 rotates by the movement mechanism 55, a wedge-shaped space opening and closing on the downstream side is formed between the pressing surface of the presser plate 21 and the supporting surface 24 of the fixed guide 6. An interval on the most downstream side of the opening is variable within a range from zero to a predetermined maximum value. FIGS. 4A and 4B illustrate a state where the posture of the scanner unit 50 changes with respect to the fixed guide 6. FIG. 4A illustrates a state where the scanner unit 50 is opened and raised (retracted posture). FIG. 4B illustrates a state where the scanner unit 50 is closed and lowered (pressing posture). When the scanner unit 50 closes, two bumping portions 52 formed at both ends of the bottom of the housing of the scanner unit 50 contact respective support portions 53 formed at both ends of the fixed guide 6, thus determining a positional relationship between the scanner unit 50 and the fixed guide 6.

At the time of a read operation, the scanner unit 50 is set to the pressing posture (referred to as a first position in which the interval is zero) in which the presser plate 21 presses the supporting surface 24. On the other hand, during a sheet feed operation or drying operation, the movement mechanism 55 retracts the scanner unit 50 to the retracted posture (referred to as a second position) in which the pressing by the presser plate 21 is released. The number of retracted postures is not limited to one, and a plurality of retracted postures may be provided so that a suitable opening state is achieved when step-feeding the sheet S, drying the sheet S, and introducing the leading edge of the sheet S.

When reading the test pattern, since the presser plate 21 is pressed onto the supporting surface 24, the slit 26 is completely shut by the fixed guide 6, preventing external light and ink mist from entering the scanner unit 50 through the slit 26. Thus, high-accuracy reading is enabled.

When the movement mechanism 55 changes the reading unit 200 from the raised state to the lowered state, the sheet S conveyed directly under the sensor unit 32 for test pattern reading is sandwiched and fixed between the bottom surface of the presser plate 21 and the supporting surface 24 of the fixed guide 6.

To maintain a high reading accuracy with the sensor unit 32, it is desirable to maintain the relative distance and relative angle between the sensor device of the sensor unit 32 and the surface of the sheet S facing it within a predetermined range. Actually, however, the sheet S may absorb moisture in ink or air, thus resulting in waving (cockling). When the sheet S is roll paper, it may have a tendency to be curled. Since the surface of the sheet S is not necessarily flat in this way, during reading, the presser plate 21 presses the sheet S against the supporting surface 24 of the fixed guide 6 to flatten the sheet S. Since the slit 7b formed on the presser plate 21 is an opening, a portion of the sheet S facing the opening cannot be pressed. However, since the width of the slit 7b (in the first direction) is very narrow, pressing the sheet S by both edges of the slit 7b enables sufficiently correcting floating portions of the sheet S in the reading area.

The presser plate 21 is an easily-deformable flexible member made of such a material as an acrylonitrile-butadiene-styrene (ABS) resin or a polycarbonate (PC) resin having a thickness of about 1 to 3 mm to prevent damage to the surface of the sheet S (particularly, a portion on which a test pattern P is formed). On the other hand, the fixed guide 6 is made of a rigid body. The supporting surface 24 of the fixed guide 6 has higher stiffness than the presser plate 21. When the presser plate 21 presses the sheet S, both the sheet S and the presser plate 21 are made into a shape along the surface shape (flat surface) of the fixed guide 6.

If the sheet S is strongly curled or cockled, a part of the flexible presser plate 21 may be lifted by a floated portion of the sheet S, possibly resulting in imperfect adhesion of the sheet S. Even in this case, in the vicinity of portions where the rotating members 35 ride on the upper surface of the presser plate 21, the rotating members 35 intensively press the presser plate 21 by the sum total of the weight of the sensor unit 32 and the urging force of the spring members 38. Therefore, floating of the sheet S from the supporting surface 24 is resolved in the vicinity of the reading position. Thus, high reading accuracy is maintained.

Figure 5:
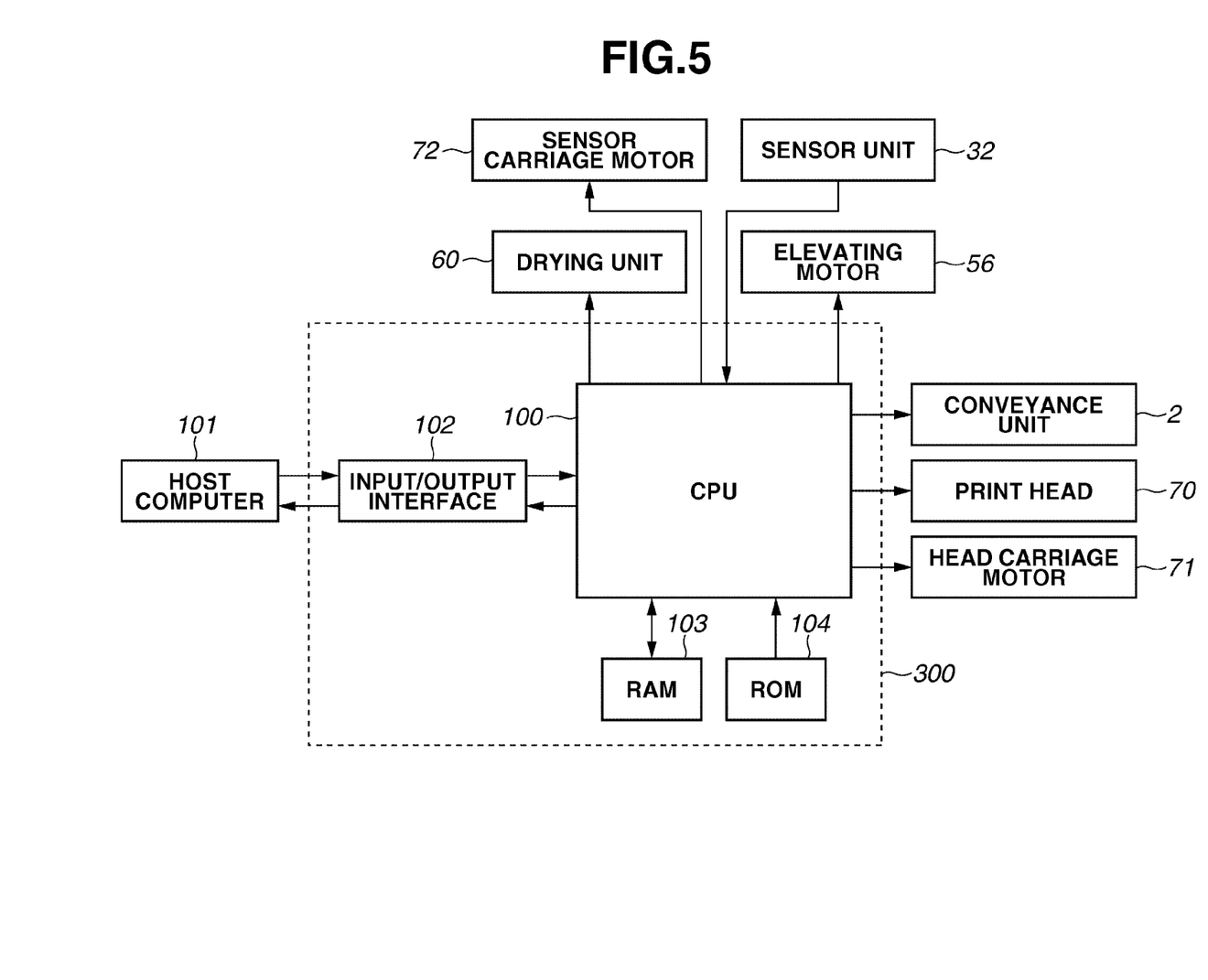
FIG. 5 is illustrates a system configuration centering on a control unit.

FIG. 5 illustrates a system configuration of the printing apparatus 100 according to the present exemplary embodiment centering on the control unit 300. The control unit 300 is a computer system including a central processing unit (CPU) 100, an input/output interface 102, a random access memory (RAM) 103, and a read-only memory (ROM) 104. These elements may be configured as an application specific integrated circuit (ASIC). The CPU 100 totally controls print operations, drying operations, read operations, and calibration operations according to a control program stored in the ROM 104. The RAM 103 is used as a work area by the CPU 100 to perform these operations. The CPU 100 inputs from the host computer 101 print data and various setting information via the input/output interface 102. The CPU 100 further controls the drive of a drive motor of the conveyance unit 2, a print head 70 of the printing unit 3, a heard carriage motor 71, a sensor carriage motor 72, an elevating motor 73, and the heater and fan of the drying unit 60. The CPU 100 further inputs a signal acquired by the sensor unit 32, and performs calibration based on the input signal.

Figure 6:
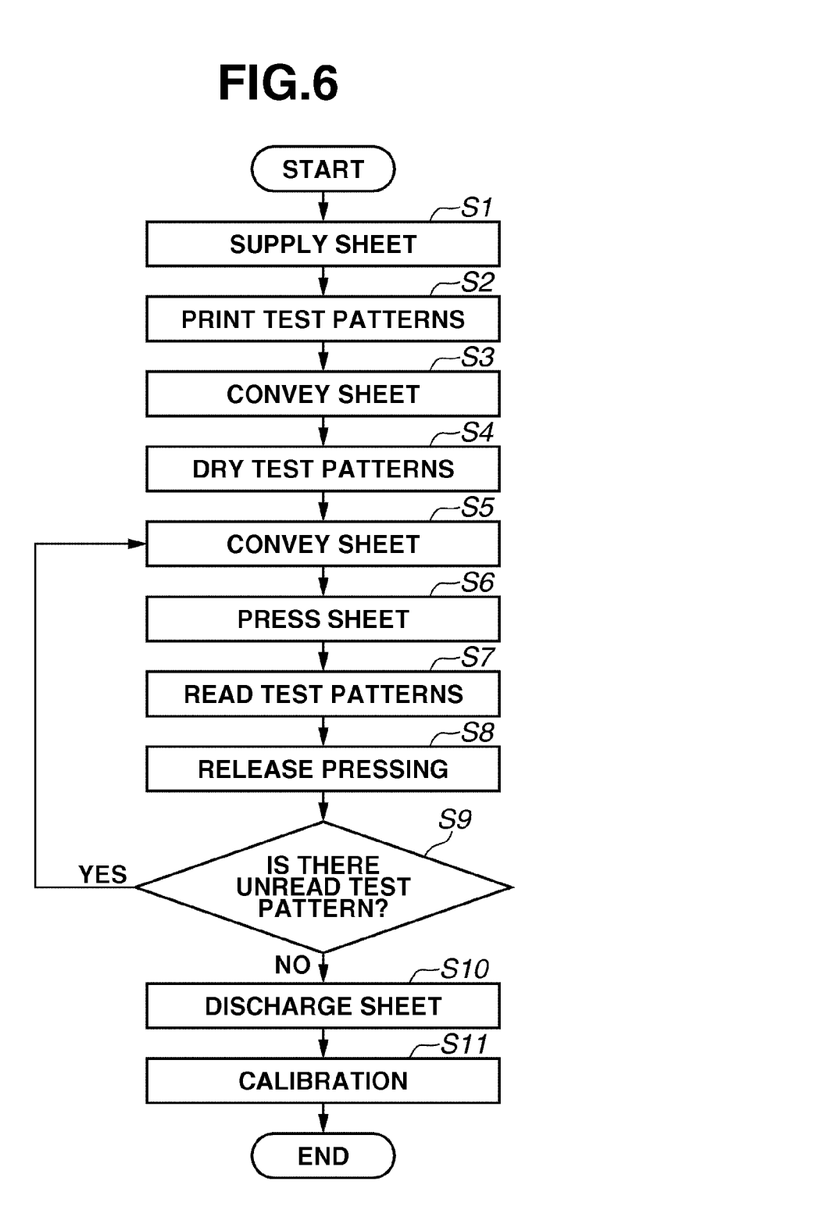
FIG. 6 is a flowchart illustrating an operating sequence of the printing apparatus.
Figure 7A:
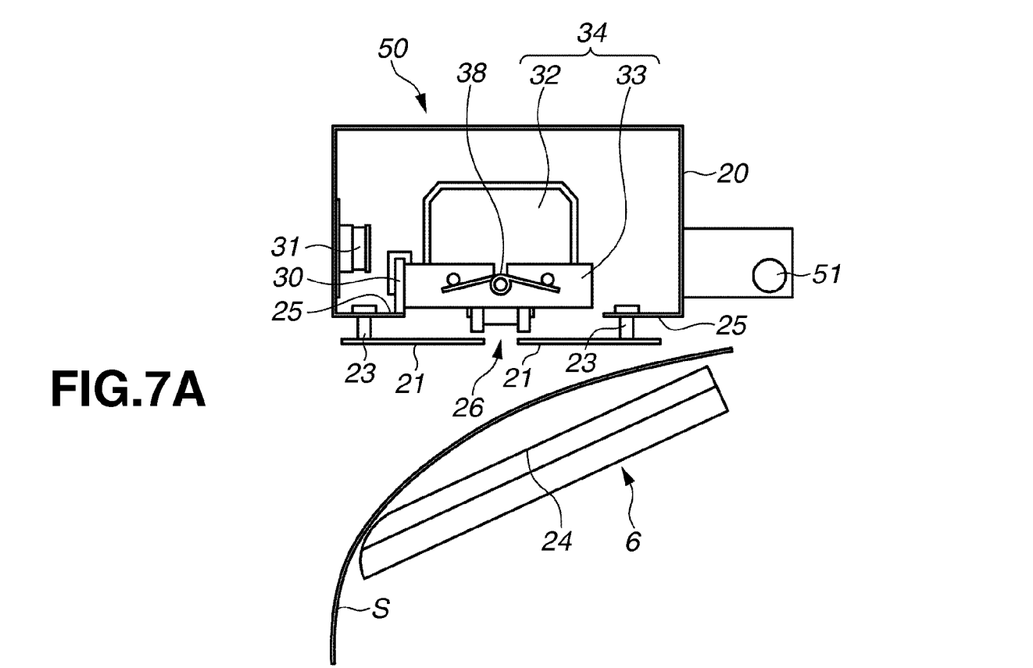
FIGS. 7A and 7B illustrate operating states of the printing apparatus.
Figure 7B:
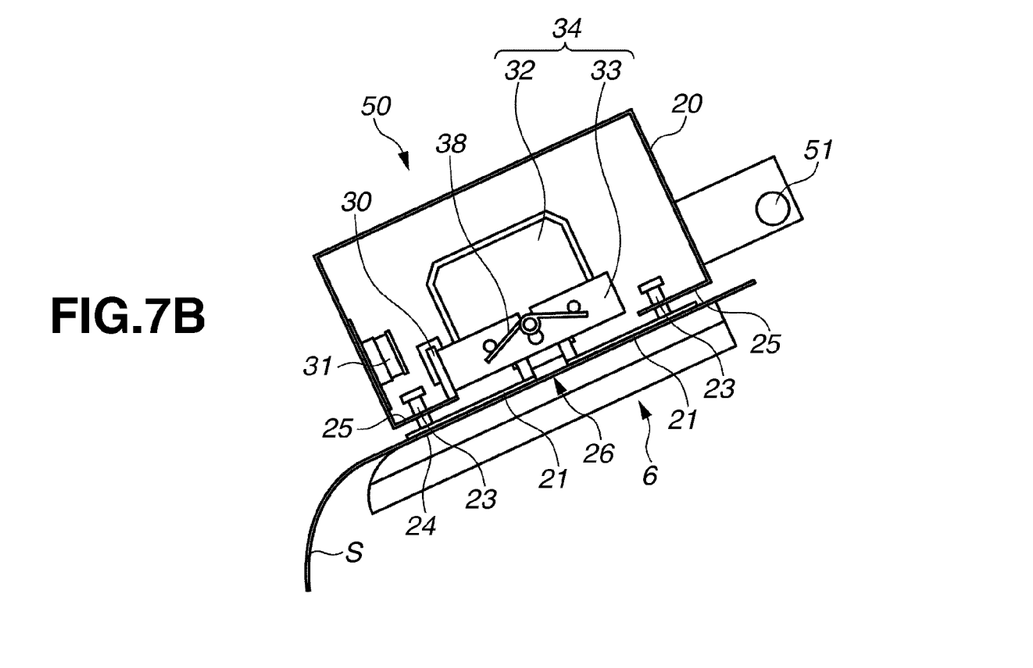

Operations performed by the printing apparatus 100 having the above-described configuration to read a test pattern and perform calibration (color calibration) will be described below. FIG. 6 is a flowchart illustrating an operating sequence controlled by the control unit 300. FIGS. 7A and 7B illustrate operating states of the printing apparatus.

In step S1, the CPU 100 supplies a sheet to be used for test. Roll paper and cut paper can be used for the printing apparatus 100 according to the present exemplary embodiment. Then, the CPU 100 takes a sheet S from the sheet feed unit 1, and conveys the sheet S to a position under the printing unit 3 via the conveyance unit 2.

In step S2, the CPU 100 prints a test pattern on the sheet S. The CPU 100 discharges ink from the print head to the sheet S supported on the platen 5, while reciprocally moving the carriage 6, to print images for one band on the sheet S. The CPU 100 forms a test pattern including a plurality of rows on the sheet S based on the serial print process, in which step-feeding of the sheet S for one band and image printing for one band are alternately repeated. The present invention is not limited to the serial print process. The test pattern may be formed based on the line print process by using line heads.

In step S3, the CPU 100 conveys the printed sheet S to the drying unit 60. Upon completion of the test pattern print process, the CPU 100 proceeds to the drying process before the image reading process to promote the dryness of ink applied to the sheet S. The CPU 100 performs such a forced drying process to shorten the time until colors of the test pattern formed on the sheet S are stabilized. As described above, the reading unit 200 includes the scanner unit 50 and the drying unit 60 disposed downstream of the scanner unit 50. The CPU 100 conveys the sheet S until the test pattern area formed on the sheet S skips the scanner unit 50 and reaches the drying unit 60. The CPU 100 conveys the sheet S until the rear end area of the test pattern reaches a position under the warm air outlet of the drying unit 60.

In step S4, the CPU 100 forcibly dries the area in which the test pattern is formed. Warm air is blown off from the air outlet of the drying unit 60 toward the sheet S. While conveying the sheet S in the reverse direction at low speed, the test pattern is forcibly dried from the rear end toward the leading edge. When drying the entire test pattern, the sheet S may be conveyed in the forward direction, not in the reverse direction.

In step S5, to read the test pattern, the CPU 100 back-feeds the sheet S. The CPU 100 conveys the sheet S in the reverse direction until the rear end of the test pattern area reaches the reading position directly under the slit 26 of the scanner unit 50. In steps S1 to S5, the scanner unit 50 is in the retracted posture (second position, raised state), where the presser plate 21 is separated from the supporting surface 24 of the fixed guide 6, thus allowing the sheet S to freely move within the interval. FIG. 7A illustrates the raised state.

In Step S6, the movement mechanism changes the scanner unit 50 from the retracted posture (second position, raised state) to the pressing posture (first position, lowered state), where the presser plate 21 presses the sheet S. FIG. 7A illustrates the lowered state. The sheet S is sandwiched and fixed between the presser plate 21 and the supporting surface 24 of the fixed guide 6.

When the sheet S is pressed, the scanner unit 50 rotates centering on the rotation shaft 51 on the upstream side to be lowered. The pressing surface of the presser plate 21 contacts the sheet S, the upstream side first, so that the contact surface gradually widens toward downstream. Therefore, the sheet S is fixed between the pressing plate 21 and the supporting surface 24 of the fixed guide 6, without slack and crease on the sheet S. Since the presser plate 21 is loosely coupled with the housing of the scanner unit 50 in a displaceable way, the impact of the first contact is small and the contact surface smoothly increases. Further, since the posture of the presser plate 21 minutely changes according to the supporting surface 24, the pressing plate 21 and the supporting surface 24 closely contact each other across the sheet S.

In step S7, the CPU 100 reads a part (one row) of the test pattern on the sheet S via the scanner unit 50. Moving together with the movement of the moving member 34 in the second direction, the sensor device of the sensor unit 32 reads one row of the test pattern on the surface of the sheet S to acquire color information. When the presser plate 21 moves, even if the surface of the presser plate 21 is locally non-planar, the sensor unit 32 minutely displaces in the rotational or vertical direction by the equalization function. Therefore, the reading position is maintained constant, thus enabling high accuracy reading.

In step S8, the movement mechanism changes the scanner unit 50 from the pressing posture (first position, lowered state) to the retracted posture (second position, raised state), where the pressing on the sheet S by the presser plate 21 is released. Then, the state illustrated in FIG. 7A is resumed.

In step S9, the CPU 100 determines whether there is any unread test pattern, i.e., whether the reading unit 200 has read all of test patterns. When the CPU 100 determines that there is any unread test pattern (YES in step S9), the processing returns to step S5. Otherwise, when the CPU 100 determines that there is no unread test pattern (NO in step S9), the processing proceeds to step S10.

Thus, the CPU 100 reads the test pattern formed in a plurality of rows by repeating the one-row read sequence via the sensor unit 32 and the sheet step-feed sequence. In the one-row read sequence, the presser plate 21 and the supporting surface 24 of the fixed guide 6 are pressed on each other. In the step-feed sequence, the pressing is released.

In step S10, the CPU 100 feeds the sheet S from which all of test patterns have been read in the forward direction to discharge it to the outside of the printing apparatus 100.

In step S11, the CPU 100 performs color-related calibration processing. The CPU 100 acquires information about colors of the test pattern based on the data obtained in pattern reading in step S7. Then, the control unit 300 performs color calibration for adjusting the amount of ink applied by the print heads for respective colors so that desired colors are reproduced in the final print product.

The above-described sequences are operations performed in a mode of color calibration. When printing a desired regular image, not a test pattern, the reading operation is not required and, therefore, steps S5 to S9 and S11 are omitted.

Figure 8:
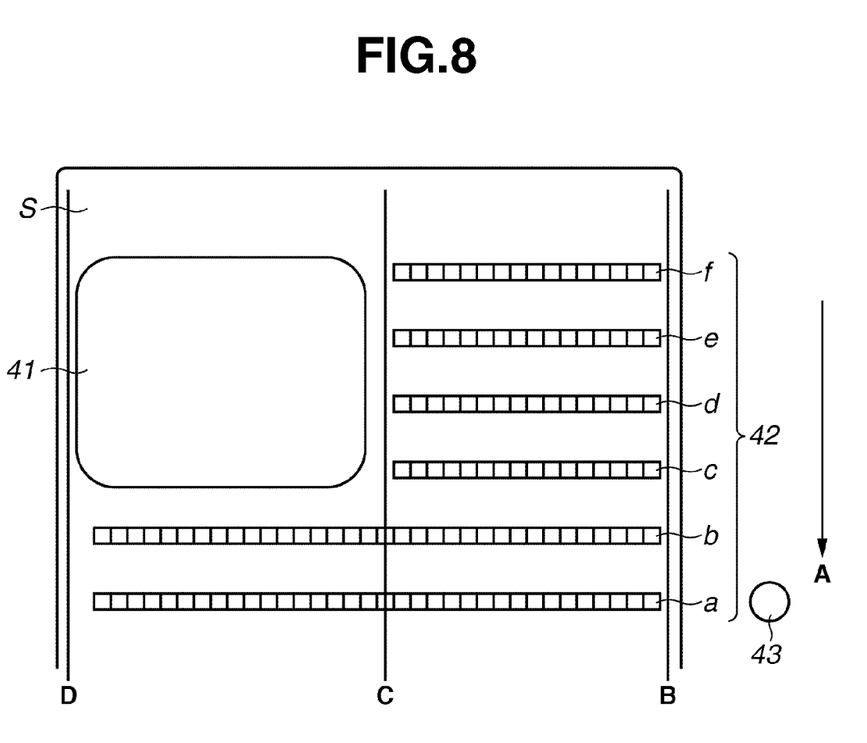
FIG. 8 illustrates an example of a test pattern formed on a sheet.

FIG. 8 illustrates an example of a test pattern formed on the sheet S. The test pattern is formed of a number of color patches 42 and a sample image 41 for comparison before and after color calibration. The layout of the color patches 42 and the sample image 41 can be freely set by the user.

In this example, the color patches 42 are formed in six rows (rows a to f) in a conveyance direction A (back feed direction) of the sheet S. The row f is a patch row on the most downstream side (the leading edge side of a sheet). The printing unit 3 forms the test pattern in order of the rows f to a. The rows a and b are formed almost over the entire sheet width, i.e., a range from position B to position D. Subsequent rows c, d, e, and f are printed over about a half of the sheet width, i.e., a range from position B to position C. The sample image 41 is formed over the remaining sheet width, i.e., a range from position C to position D.

The reading unit 200 reads the color patches 42 formed in this layout in order of the rows a to f one by one, by repeating step-feeding (back feed). The home position of the carriage 33 exists on the position B side.

The sheet S on which the test pattern is formed by the printing unit 3 is back-fed until the first row a reaches the reading position directly under the slit 26. At this timing, the scanner unit 50 is set to the retracted posture (the state illustrated in FIG. 7A). Subsequently, the CPU 100 sets the scanner unit 50 to the pressing posture (the state illustrated in FIG. 7B) to press the sheet S between the presser plate 21 and the supporting surface 24. The CPU 100 reads the patches in the row a one by one from position B to position D via the sensor unit 32 while moving the carriage 33 from position B to position D for scanning. Subsequently, the CPU 100 sets the scanner unit 50 to the retracted posture, and then step-feeds the sheet S in the back feed direction by the distance of one patch row. Then, the CPU 100 sets the scanner unit 50 to the pressing posture again, and then reads the patches in the row b one by one from position D to position B via the sensor unit 32 while moving the carriage 33 from position D to position B for scanning. When the read sequence for the row b is completed, the CPU 100 sets the scanner unit 50 to the retracted posture, and then step-feeds the sheet S in the back feed direction.

The scanning direction of the read sequence alternately changes for each row in this way. As described above, the scanning direction of the read sequence for each patch row may be constantly the same direction (from position B to position D). In this case, the CPU 100 performs the operation for returning the carriage 33 to the home position (on the position B side) while step-feeding the sheet S.

When subsequently reading the patches in the rows c and d, the CPU 100 sets the scanning range to the distance corresponding to the length of each patch row in the sheet width direction. The CPU 100 sets the scanner unit 50 to the pressing posture, and then reads the patches in the row c one by one from position B to position C via the sensor unit 32 while moving the carriage 33 from position B to position C for scanning. Subsequently, the CPU 100 sets the scanner unit 50 to the retracted posture, and then step-feeds the sheet S in the back feed direction. The CPU 100 sets the scanner unit 50 to the pressing posture, and then reads the patches in the row d one by one from position C to position B via the sensor unit 32 while moving the carriage 33 from position C to position B for scanning. When the read sequence for the row d is completed, the CPU 100 sets the scanner unit 50 to the retracted posture, and then step-feeds the sheet S in the back feed direction.

Thus, the CPU 100 can shift to the following row without scanning the area of the sample image 41 not subjected to colorimetry, thus improving the reading throughput. Further, since the carriage 33 does not move on the sample image 41, the rotating members 35 do not strongly press the sample image 41 via the flexible presser plate 21, thus reducing any damage of the sample image 41.

When subsequently reading the patches in the rows e and f, similar to the above-described sequences, the CPU 100 sets the scanning range to the distance corresponding to the length of each patch row in the sheet width direction. However, in this example, after the read sequence for the row e, the CPU 100 performs sensor calibration processing for maintaining constant the reading characteristics of the sensor, which may change with the temperature. In the sensor calibration processing, the CPU 100 reads the color information for the surface of a color calibration plate via the sensor unit 32, and then adjusts the sensor or corrects the sensor output so that correct results of reading are obtained. Therefore, a color calibration plate 43 is disposed on the reference plate 25 outside the sheet S (home position side).

The CPU 100 sets the scanner unit 50 to the pressing posture, and then reads the patches in the row e one by one from position B to position C via the sensor unit 32 while moving the carriage 33 from position B to position C for scanning. In this case, the CPU 100 performs the sensor calibration processing before the read sequence for the row f. Since the color calibration plate 43 is disposed on the position B side, it is necessary to move the sensor unit 32 to the color calibration plate 15. The CPU 100 sets the scanner unit 50 to the retracted posture, and then moves the carriage 33 from position C to position B, and further up to the color calibration plate 43 outside while step-feeding the sheet S in the back feed direction. Then, the CPU 100 sets the scanner unit 50 to the pressing posture, and then reads the surface of the color calibration plate 43 via the sensor unit 32 to acquire color information. The control unit 300 performs the sensor calibration processing based on the acquired color information. Upon completion of the sensor calibration processing, similar to the above-described sequences, the CPU 100 reads the patches one by one in the last row f from position B to position C, returns the carriage 6 to the home position, and terminates the series of processing.

Upon completion of the read sequences for all of patch rows, the control unit 3 performs color calibration for adjusting the amount of ink applied by the print heads for respective colors so that desired colors are reproduced in the final print product.

According to the above exemplary embodiment, the total throughput and reading accuracy in the read sequences for a test pattern formed in a plurality of rows are improved. Specifically, the present exemplary embodiment achieves both a reduction in the total calibration time and an improvement in the reading accuracy of the reading apparatus. As a result, the calibration time, which is an unproductive time for a user of the printing apparatus, can be shortened. The user can use more time for image printing, which is an intended purpose, thus improving the productivity in printing operations.

Particularly in the present exemplary embodiment, the scanner unit 50 includes the presser plate 21 for pressing the supporting surface 24 supporting the sheet S, and the carriage 33 holding the sensor unit 32 and reciprocally moving on the presser plate 21, and the pressure plate 7 and the carriage 6 are integrated into one unit. Thus, since the entire reading unit 200 including the presser plate 21 retracts from the sheet S to allow sheet conveyance, the sheet conveyance operation can be started regardless of the position of the carriage 33. This remarkably contributes to an improvement in the total throughput in processing for reading the test pattern by repeating the read and step-feed sequences.

In addition, since the rotating members 35 are constantly on the presser plate 21 without level differences, no impact occurs while the moving member 34 is moving. Therefore, a sensor failure due to the degraded attachment accuracy of the sensor unit 32 is not likely to occur, thus maintaining high reading accuracy for a prolonged period of time.

Further, the presser plate 21 is loosely coupled with the housing of the scanner unit 50 in a displaceable way. Therefore, when the scanner unit 50 is set to the pressing posture, the posture of the presser plate 21 minutely changes according to the supporting surface 24, and the pressing plate 21 and the supporting surface 24 closely contact each other across the sheet S. Further, since the impact occurring when the upstream side of the presser plate 21 first contacts the sheet S is small and then the contact surface smoothly widens, no slack or crease occurs on the sheet S.

Further, in the present exemplary embodiment, in repetitive read and step-feed (back feed) sequences, during the read and step-feed sequences for one row, a sheet area having another row to be subsequently read is dried by the drying unit. In processing for reading the test pattern by repeating three sequences (dry, read, and step-feed sequences), the read and step-feed processing and the drying processing are performed in parallel, i.e., overlapped in time sequence, thus remarkably improving the total throughput.

Further, in the present exemplary embodiment, there is no conveyance roller on the downstream side of the printing unit 3, and the test pattern is read by repeating the step-feed (back feed) sequence. The test pattern printed by the printing unit 3 is not nipped by the conveyance roller at least until the read sequence by the scanner unit U is completed. Therefore, regardless of the length of the formed test pattern in the conveyance direction, the test pattern is not damaged or the conveyance roller is not stained by ink before reading, thus ensuring high-accuracy read operations for a prolonged period of time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-257426 filed Nov. 25, 2011, which is hereby incorporated by reference herein in its entirety.

What is claimed is:

1. A reading apparatus comprising:
    a reading unit including a sensor unit configured to read information on a sheet, a presser configured to press a supporting surface for supporting the sheet, a carriage configured to hold the sensor unit and to move on the presser, and a housing configured to store the sensor unit and the carriage and to hold the presser in a displaceable way; and
    a movement mechanism configured to move the reading unit to a first position in which the presser presses the supporting surface and a second position in which the pressing is released,
    wherein the reading unit is set to the first position during reading of the information and is set to the second position during movement of the sheet on the supporting surface, and the carriage stays on the presser in either a case where the reading unit is set to the first position or a case where the reading unit is set to the second position.

2. The reading apparatus according to claim 1, wherein the movement mechanism is configured to rotate the reading unit to move between the first position and the second positions.

3. The reading apparatus according to claim 2, wherein the supporting surface includes an inclined surface whose downstream side is lowered in gravity direction, and
    wherein, in the first position, the presser is inclined according to the inclined surface.

4. The reading apparatus according to claim 1, wherein the presser is retained to the housing via coupling members provided at a plurality of positions, and
    wherein, at each of the coupling members, a column fixed to the presser is loosely coupled with a hole formed on the housing.

5. The reading apparatus according to claim 4, wherein, at each of the coupling members, the column is loosely coupled with the hole so that the column is allowed to displace within a permitted range in vertical and oblique directions with respect to the housing.

6. The reading apparatus according to claim 1, wherein the presser includes first and second portions each having an oblong shape extending within a predetermined range in a direction parallel to a moving direction of the carriage, the first and second portions being disposed opposite each other across a reading area of the sensor unit,
    wherein a bottom portion of the sensor unit includes a first contact member configured to contact a surface of the first portion during movement of the carriage, and a second contact member configured to contact a surface of the second portion during movement of the carriage, and
    wherein each of the first and second portions is retained to the housing in a displaceable way.

7. The reading apparatus according to claim 6, wherein each of the first and second contact members is a rotating member configured to contact a surface of the presser to be rotatably driven.

8. The reading apparatus according to claim 1, wherein the presser is made of a flexible plate member having lower stiffness than the supporting surface has.

9. A printing apparatus comprising:
    a printing unit configured to record information on a sheet; and
    the reading apparatus according to claim 1.

10. The printing apparatus according to claim 9, wherein a conveyance roller for conveying the sheet is disposed upstream of the printing unit, and no conveyance roller is disposed downstream of the printing unit.

11. The printing apparatus according to claim 9, wherein a sheet on which a pattern is formed by the printing unit is conveyed until an area having the formed pattern passes a reading area of the sensor unit, and subsequently the sensor unit reads the pattern while conveying the sheet in a reverse direction.

12. The printing apparatus according to claim 11, wherein the pattern formed in a plurality of rows is read by repeating a one-row read sequence, in which one row of the pattern is read at a time via the sensor unit while moving the carriage, and a step-feed sequence, in which the sheet is fed one step at a time, and     wherein the reading unit is set to the first position during the one-row read sequence and is set to the second position during the step-feed sequence.

13. The printing apparatus according to claim 9, wherein the reading unit further includes a drying unit configured to blow off air to the sheet, the drying unit being disposed downstream of the sensor unit.

* * * * *